US005462471A

United States Patent [19]

Power-Fardy

[11] Patent Number: 5,462,471

[45] **Date of Patent: * Oct. 31, 1995**

[54] SELF-CONTAINED DISPLAY DEVICE FOR HEADWEAR

[76] Inventor: Stephen N. Power-Fardy, 4233 W. 172nd St., Torrance, Calif. 90504

[ * ] Notice: The portion of the term of this patent subsequent to Dec. 1, 2009, has been disclaimed.

[21] Appl. No.: 227,056

[22] Filed: Apr. 13, 1994

Related U.S. Application Data

[63] Continuation of Ser. No. 879,197, Jun. 11, 1992, abandoned, which is a continuation-in-part of Ser. No. 699,672, May 14, 1991, Pat. No. 5,167,559.

[51] Int. Cl.$^6$ .......................... A63H 33/00; A63H 13/18; C09F 3/00

[52] U.S. Cl. .............................. 446/26; 446/396; 40/329; 40/414; 2/209.13; 2/195.1

[58] Field of Search .............................. 24/3 R, 3 J, 457; 2/209.13, 195.1; 446/26, 27, 28, 322, 396, 272, 486; 40/329, 414, 419; 63/1.1, 2, 20

[56] References Cited

U.S. PATENT DOCUMENTS

| | | | |
|---|---|---|---|
| 4,406,040 | 9/1983 | Cannone | 24/3 J |
| 4,488,372 | 12/1984 | Lowen | 446/27 |
| 4,525,878 | 7/1985 | Lowe, Jr. | 2/209.13 |
| 4,560,166 | 12/1985 | Emerson | 2/209.13 X |
| 4,985,935 | 1/1991 | Hur | 2/209.13 X |
| 5,088,127 | 2/1992 | Thornock | 2/209.13 |

FOREIGN PATENT DOCUMENTS

| | | |
|---|---|---|
| 2322046 | 3/1977 | France . |

OTHER PUBLICATIONS

Magic Vigor (R) patent pending N. 75210371.

The Johnson Smith Company Catalog pp. 24, 26, 53, 56.

The Sharper Image Catalog p. 6.

*Primary Examiner*—Robert A. Hafer
*Assistant Examiner*—D. Neal Muir
*Attorney, Agent, or Firm*—Lyon & Lyon

[57] ABSTRACT

A display device suitable for attachment to headwear having a self-contained power source, a reciprocating arm powered by the self-contained power source, and a display symbol at the wagging end of the reciprocating arm. The display device may also have one or more additional reciprocating arms or an audio source, and the display symbols may be permanently attached, replaceable or interchangeable.

6 Claims, 2 Drawing Sheets

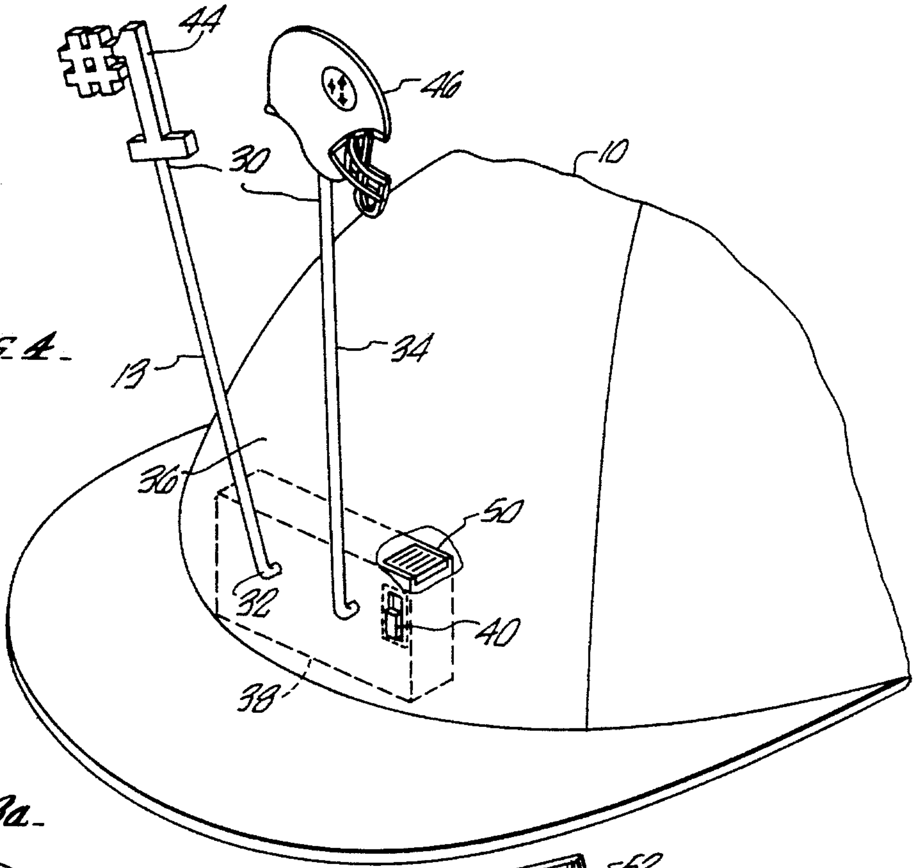
FIG. 4
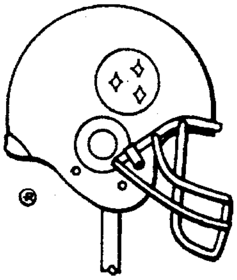
FIG. 3a
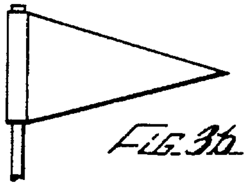
FIG. 3b
FIG. 5
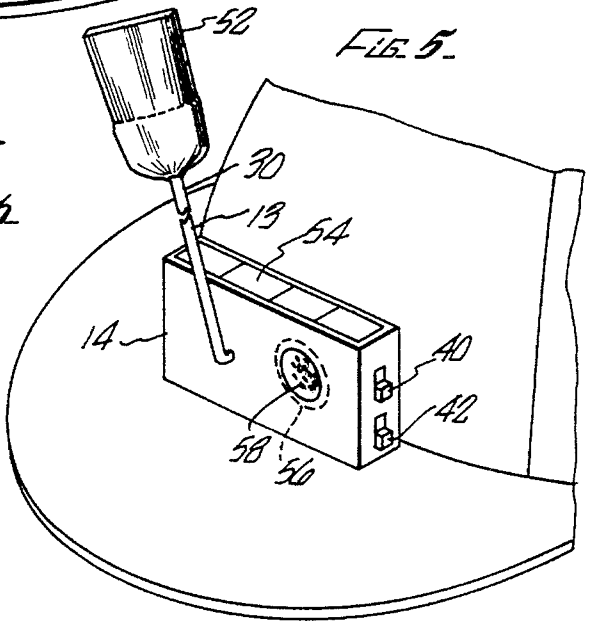
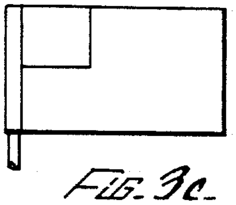
FIG. 3c
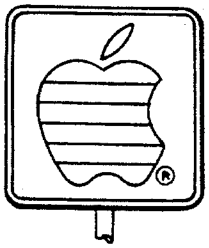
FIG. 3d
FIG. 3f
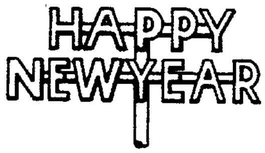
FIG. 3e
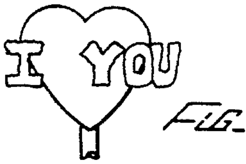
FIG. 3g

SELF-CONTAINED DISPLAY DEVICE FOR HEADWEAR

This application is a continuation of application Ser. No. 07/879,197 filed Jun. 11, 1992 now abandoned which is a continuation-in-part of application Ser. No. 07/699,672, filed May 14, 1991, now U.S. Pat. No. 5,167,559.

FIELD OF THE INVENTION

The field of the present invention is self-contained, powered display devices for headwear. More particularly, the field of the present invention includes display devices for headwear wherein the display device is powered by a self-contained power source and has one or more movable parts suitable for displaying a symbol.

BACKGROUND OF THE INVENTION

Headwear, such as caps, headbands and hats, has been used in the past as a site for attaching a device for display or other use on or about the wearer's head. For example, Cureton, U.S. Pat. No. 1,618,517, issued Feb. 22, 1927, shows a donkey's ear-like appendage attached to the side of a hat and moved up and down simultaneously with the wearer (or other person) pulling on a string. Perlman, U.S. Pat. No. 4,832,647, issued May 23, 1989, discloses a hat "clapper" wherein hands attached to the side of a hat are caused to move back and forth in a clapping motion due to simultaneous pulling on a string. Also, Dane, U.S. Pat. No. 4,856,280, issued May 6, 1986, shows a mug on top of the visor of a baseball cap and having a device that makes it look as though a fluid is being continuously dispensed into the mug. The device contains a small motor and pump to circulate the fluid from the bottom of the mug up through a conduit within the cap to a small dispensing tap mounted above the mug. Lowen, U.S. Pat. No. 4,488,372, issued Dec. 18, 1984, shows a motor driven "beanie" type of head device showing a long rod attached at the top of the wearer's head that rotates in a circle.

With the advent of the baseball cap, sports teams, advertisers and cap manufacturers have sewn, stitched, ironed-on, and through various other means, affixed the logo of their teams, company or message to the forehead covering portion of the cap.

Others have made the visor of a translucent plastic and painted their logos or messages directly onto the visor.

The U.S. Military uses the visor to display rank. In the army the visor on caps is used to display the stars of generals. And in the navy and NASA, the visor is used to display the "scrambled eggs" epaulets of officers.

U.S. Pat. No. 4,836,820 to Satoru Ebihara, and Jiro Yamaguchi illustrates a moving animal toy whose wind-up operating mechanism is the closest application of a wind up system the applicant could find to the invention present for the Examiner's review in this patent application. Likewise, U.S. Pat. No. 4,422,261 to Michihiro Kozuka, and Masayuki Tonokura teaches a method of accomplishing pivotal movement of a toy on a support surface with a similar wind-up mechanism.

MAGIC VISOR®, patent pending n. 75210371, distributed by Davidcraft Corporation, Ill. 60645, illustrates a battery powered visor that features a fan, a flashlight and an air freshener.

The Johnson Smith Company (4514 9th Court East, P.O. Box 255500, Bradenton, Fla. 34206-5500) catalog offers for sale many hat inventions and novelties in its current "Things You Never Knew Existed (TM) . . . and others you can't possibly live without!" catalog. On page 24 of the company's catalog issue No. 912, the company offers for sale a Deluxe AM/FM cap. According to the sales copy it's a lightweight cap with a concealed built-in radio. Earphones are incorporated into the design and wires are hidden from view.

Page 6 of the Mar. 1991 "The Sharper Image" catalog (650 Davis Street, San Francisco, Calif. 94111) shows a baseball cap with a solar powered fan.

SUMMARY OF THE INVENTION

The present invention comprises a display device for attachment to, or integral construction within, headwear such as a hat, baseball cap, headband or other headpiece. The display device comprises an appropriately sized self-contained power source that may be effectively enclosed within a housing or may be otherwise attached to the display device and a reciprocating arm attached at a first, or attached, end to gears powered by the self-contained power source, which reciprocating arm is caused by the self-contained power source to reciprocate such that a second, or wagging, end of the reciprocating arm moves in a wagging motion, and a display symbol attached at or near the wagging end of the reciprocating arm. The present invention may further comprise one or more additional reciprocating arms, one or more additional or interchangeable display symbols, one or more additional appropriately sized power sources, and/or a self-contained music or audio source that may be attached to, or contained within, the display device.

It is a feature of the present invention to provide a display device having a movable, reciprocating component that highlights a desired symbol, such as without limitation a musical note, a team logo, a pennant, a symbol, a flag, a product logo, a seasonal greeting, an advertising slogan, a message, a hand with the index finger extended, a broom, or a "#1," or the like.

It is a further aspect of the invention to provide a display device having a reciprocating arm such that the device does not rotate in a circle so that the display device may be worn at any place on or about the head without fear of contacting the nose, ears or shoulders of the wearer.

It is another aspect of the invention to provide a self-contained power source to power the display device so that the motion imparted to the movable reciprocating arm of the device does not require coordinated, simultaneous manipulation by the wearer in order to cause motion within the display device.

It is an even further aspect of the invention to provide an audio source for inclusion within or on the display device that emits sounds independently of or in conjunction with movement of the display device. For example, the audio may be a desired song, such as a school fight song.

It is an even further aspect of the present invention to provide a display device that may be made integrally within or placed permanently or releasably upon a piece of headwear.

FIG. *3a* is a front view of a display symbol comprising a team logo.

FIG. *3b* is a front view of a display symbol comprising a pennant.

FIG. *3c* is a front view of a display symbol comprising a flag.

FIG. *3d* is a front view of a display symbol comprising a product logo.

FIG. *3e* is a front view of a display symbol comprising a seasonal greeting.

FIG. *3f* is a front view of a display symbol comprising an advertising slogan.

FIG. *3g* is a front view of a display symbol comprising a message.

FIG. 4 is a front raised lateral view of a display device integral with a headpiece and having a battery powered self-contained power source, and also having an additional reciprocating arm display with the display symbols arranged so as to convey a message that one display symbol has a certain relation to the other.

FIG. 5 is a front raised lateral view of a display device having a solar powered self-contained power source and an integral self-contained audio source, along with two on-off switches, and wherein the display symbol is a #1.

DETAILED DESCRIPTION OF THE PREFERRED EMBODIMENTS

Figure 1:
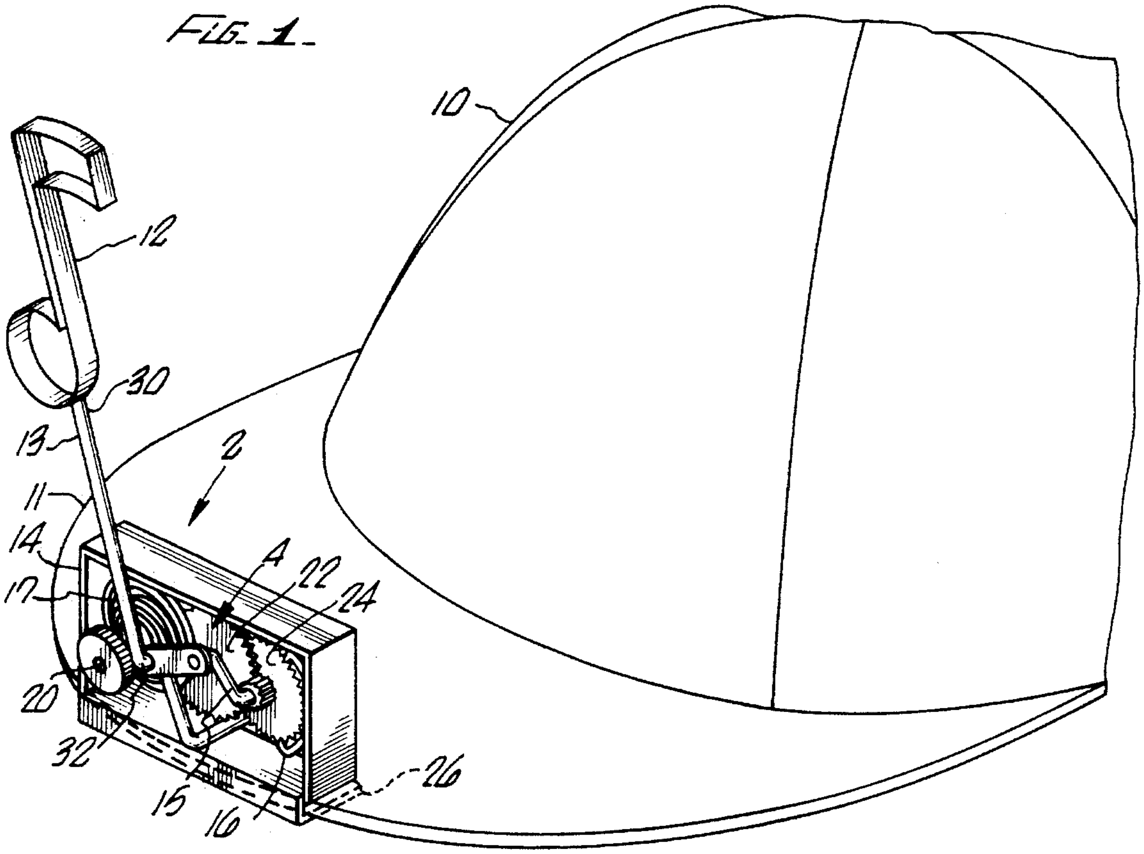
FIG. 1 is a front raised lateral view showing a display device having an internal winding mechanism for the self-contained power source, and showing the power source releasably attached to the bill of a hat by a spring-grasping mechanism, and having a musical note as the display symbol.

Referring to FIG. 1, the display device 23 is powered by a self-contained power source 4, by which is meant that the self-contained power source powers a mechanism for transmission of power (such as offset driveshaft 15 and gears 22 and 24) to provide a reciprocating motion to the reciprocating arm 13 of the display device without requiring simultaneous, coordinated manipulation by the user or any other outside source to attain reciprocation. The self-contained power source may also be attached to said display device, for example by a wire able to transmit electricity. However, consistent with present invention, the user or other person may be employed to either provide energy to the self-contained power source, such as by winding up the spring mechanism depicted in FIG. 1, or by providing energy to other spring mechanisms including those not requiring gears, or by activating an on/off switch or rheostat type switch to cause power to be emitted from the self-contained power source to the reciprocating arm.

The self-contained power source 4 depicted in FIG. 1 is partially enclosed within a housing 14. The housing 14 may also effectively enclose the self-contained power source as shown in FIG. 5, by which is meant the power source is enclosed except for its attachment to the reciprocating arm, and/or except for an on/off switch, a battery port or solar power panel or other port for energy provision, or a speaker. The self-contained power source 4 has a flat spring 17 that may be wound up by a wind-up knob 20 that provides power to the reciprocating arm 13 upon unwinding, through a series of gears 22 and 24. The gears are controlled in part by an escapement 16.

Reciprocating arm 13 is attached at a first, or attached, end 32 via an offset drive shaft 15 to gear 24 powered by the self-contained power source 4. The reciprocating arm also has at a second, or wagging, end 30 a display symbol, depicted in FIG. 1 as musical note 12. It is a feature of the invention that such a display symbol may be permanently or releasably attached to the wagging end of the reciprocating arm, and may be interchangeable with other display symbols. The display symbol is attached at or near the wagging end of the reciprocating arm, which means the display symbol is located on the arm such that the display symbol wags during operation of the display device.

In FIG. 1, the present invention is depicted releasably attached by a spring-clamp grasping mechanism 26 to the front of the visor 11 of a baseball cap 10.

Figure 2:
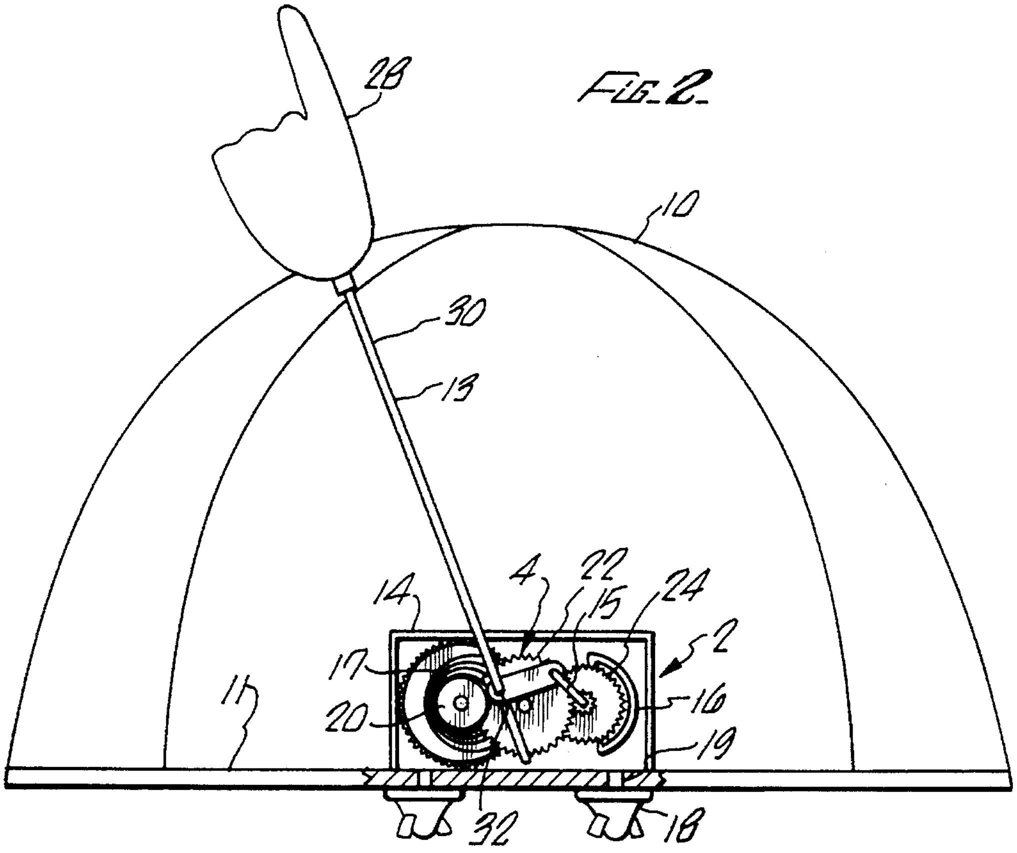
FIG. 2 is a front view showing a display device having a self-contained power source comprising an internal winding mechanism attached to the visor of a hat by means of pins piercing the visor, and having a display symbol comprising a hand with the index finger extended.

FIG. 2 depicts a display device having an internal winding mechanism for the self-contained power source 4 and a hand with index finger extended 28 as the symbol attached to the free end 30 of the reciprocating arm 13, with the attached end 32 of the reciprocating arm 13 powered by the self-contained power source 4 through the offset drive shaft 15. The display device in FIG. 2 is depicted having spike shaped members 19 that pierce through the visor 11 of the baseball cap 10, and that have fasteners 18 to hold said spike shaped members 19 in place.

FIGS. *3a* to *3g* depict various embodiments of a display symbol.

FIG. 4 depicts a display device having multiple reciprocating arms 13 and 34 and having an, battery powered, electric motor self-contained power source 38. Such batteries and motors are known in the art. In FIG. 4, the battery powered, electric motor self-contained power source is located integrally within the dome 36 of baseball cap 10. Such power source could also be located at the side, back or top of baseball cap 10. Reciprocating arm 13 is connected at attached end 32 to the battery powered, electric motor self-contained power source 38. On/off switch 40 can be used to control the self-contained power source, which then controls reciprocation of both reciprocating arm 13 and additional reciprocating arm 34. The display device may also have further additional reciprocating arms if desired. Further, the multiple reciprocating arms 13 and 34 may be timed or coordinated so as to reciprocate in cooperation such that one symbol 44 may appear to have a certain relationship to another symbol 46. The battery powered self-contained power source may also have a battery port 50 for inserting and removing batteries for the device. Such batteries may also be non-replaceable.

Turning to FIG. 5, the display device of the invention is depicted having a broom symbol 52 attached to the wagging end 30 of the reciprocating arm 13, and having a solar panel 54 to provide energy for a solar powered self-contained power source. Appropriate solar power supplies are known in the art.

The embodiment depicted in FIG. 5 further includes an audio source 56 having a speaker 58. The audio source 56 is appropriately sized such that it can be contained within or attached to housing 14 without preventing reciprocation by the reciprocating arm 13. Appropriately sized audio sources are known in the art. Also depicted in FIG. 5 is a first on/off switch 40, which may be used to control both the reciprocating arm 13 and the audio source 56, or there may be a second on/off switch 42, to control one or the other of the reciprocating arm 13 and the self-contained audio source 56.

The display device of the present invention could also include any other combination of additional reciprocating arms and/or one or more musical speakers or self-contained musical sources. Any combination may also include one or more auxiliary, self-contained power sources.

When more than one reciprocating arm is used, the reciprocating arms are preferably designed so that the arms do not interfere with one another's reciprocation. For example, the attached end of one reciprocating arm may be extended from the housing so that one arm reciprocates effectively in front of the other arm.

The present embodiments of this invention are to be considered in all respects as illustrative and not restrictive, the scope of the invention being indicated by the appended claims rather than the foregoing description, and all changes which come within the meaning and range of equivalency of the claims therefor are intended to be embraced therein.

What is claimed is:

1. A display device for attachment to headwear comprising:

a self-contained power source able to reciprocate a reciprocating arm and effectively enclosed within a housing, wherein said power source oscillates said reciprocating arm at one pace through one established arc of movement in one plane;

a plate resiliently extending from and integral with a base of said housing, wherein said plate comprises a spring-clamp grasping mechanism connected to said base and is adapted to releasably engage a portion of a planar extension of said headwear;

one or more reciprocating arms extending through said housing and attached at a first end of said reciprocating arms to a mechanism for transmission of power from said self-contained power source and having a display symbol attached at the end of the second end of said reciprocating arm.

2. The display device of claim 1 wherein said display symbol is selected from the group consisting of a hand, a musical note, a team logo, a pennant, a flag, a product logo, a seasonal greeting, an advertising slogan, a message, a slogan, a logo, a broom, a hand with the index finger extended, a number one symbol, or sporting equipment with a slogan or a logo.

3. The display device of claim 1 wherein said self-contained power source is selected from the group consisting of a battery powered electric motor, a solar powered electric motor or a wind up spring motor.

4. The display device of claim 1 further comprising an appropriately sized audio source.

5. The display device of claim 4 wherein said appropriately sized audio source is an electronic device which emits sound.

6. The display device of claim 1 wherein said display symbol is releasably attached to said reciprocating arm.

* * * * *